(12) United States Patent
Yang et al.

(10) Patent No.: US 12,270,684 B2
(45) Date of Patent: Apr. 8, 2025

(54) EASY-TO-ASSEMBLE MOUNTING RACK FOR DEFORMATION DETECTION DEVICE FOR STEEL STRUCTURE AND ASSEMBLING METHOD THEREOF

(71) Applicant: North China University of Science and Technology, Tangshan (CN)

(72) Inventors: Jiudong Yang, Tangshan (CN); Fenghua Wu, Tangshan (CN); Muyao Shi, Tangshan (CN); Lingyun Zhang, Tangshan (CN); Liwen Yin, Tangshan (CN); Gui'e Tian, Tangshan (CN); Jinliang Hou, Tangshan (CN); Lipeng Gong, Tangshan (CN)

(73) Assignee: North China University of Science and Technology, Tangshan (CN)

( * ) Notice: Subject to any disclaimer, the term of this patent is extended or adjusted under 35 U.S.C. 154(b) by 192 days.

(21) Appl. No.: 18/213,545

(22) Filed: Jun. 23, 2023

(65) Prior Publication Data
US 2024/0102834 A1    Mar. 28, 2024

(30) Foreign Application Priority Data
Sep. 28, 2022    (CN) .......................... 202211188089.X (51) Int. Cl.
*G01D 11/30*    (2006.01)

(52) U.S. Cl.
CPC .................................. *G01D 11/30* (2013.01)

(58) Field of Classification Search
CPC ..................................................... G01D 11/30
See application file for complete search history.

(56) References Cited

FOREIGN PATENT DOCUMENTS

CN            105215890 A   *   1/2016

* cited by examiner

*Primary Examiner* — Jamel E Williams
(74) *Attorney, Agent, or Firm* — Suiter Swantz IP (57) ABSTRACT

An easy-to-assemble mounting rack for a deformation detection device for a steel structure and an assembling method thereof are provided. The easy-to-assemble mounting rack includes mounting parts including a back mounting plate, an operating rod, an adjusting seat, a ball-shaped block and an upright rod. The upright rod is vertically fixed at the bottom end face of the adjusting seat. A ball-shaped hole is formed in the adjusting seat. The ball-shaped block is rotatably embedded in the ball-shaped hole. A plug-in hole is formed in a radial direction of the ball-shaped block. One end of the operating rod slidably penetrates through the plug-in hole and is detachably connected with the back mounting plate. Screw holes directly opposite to the mounting holes of the deformation detection device are formed on the back mounting plate. The other end of the operating rod is fixedly sleeved with a counterweight plate.

18 Claims, 8 Drawing Sheets

EASY-TO-ASSEMBLE MOUNTING RACK FOR DEFORMATION DETECTION DEVICE FOR STEEL STRUCTURE AND ASSEMBLING METHOD THEREOF

CROSS REFERENCE TO RELATED APPLICATION

This patent application claims the benefit and priority of Chinese Patent Application No. 202211188089.X, entitled "EASY-TO-ASSEMBLE MOUNTING RACK FOR DEFORMATION DETECTION DEVICE FOR STEEL STRUCTURE AND ASSEMBLING METHOD THEREOF" filed on Sep. 28, 2022, the disclosure of which is incorporated by reference herein in its entirety as part of the present disclosure.

TECHNICAL FIELD

The present disclosure relates to the mounting technique field of a deformation detection device for a steel structure, and specifically relates to an easy-to-assemble mounting rack for a deformation detection device for a steel structure and an assembling method thereof.

BACKGROUND

Deformation detection is performed by continuously observing the deformation phenomenon of the deformed body, analyzing the deformation form of the deformed body and predicting the development trend of the deformed body utilizing special instruments and methods. Steel structures are high in hardness and may be used as supporting parts to play a supporting role. If irreversible deformation cannot be found in time, great security risks exist. Through deformation detection, the deformation of the steel structures may be monitored, so once abnormal deformation is found, the deformation may be analyzed, researched and processed in time to adopt measures, and accidents are prevented.

The Chinese application with the application number CN201510740506.0 provides a fixed device for overall deformation detection of ancient wooden structures, which mainly uses telescopic rods in the vertical and horizontal directions and a bearing device of a deformation detector to replace the traditional fixed device or the data acquisition method. Thus, it is easy to operate and use in the field. Therefore, the data collected by the deformation detection is accurate, and the detection efficiency and the safety of the deformation detector are improved. The above fixed device can only adjust the position of the detection device in two directions. Due to the different sizes and lengths of different steel structures, the detection position of the detection device cannot be quickly adjusted according to the detection position in the steel structure detection process of the existing deformation detection device for the steel structure, thereby resulting in low efficiency of the deformation detection of the steel structure, which does not meet the requirement of the deformation detection.

SUMMARY

A technical problem to be solved by the present disclosure is to provide an easy-to-assemble mounting rack for a deformation detection device for a steel structure and an assembling method thereof to solve the problem of how to improve the efficiency of the deformation detection of the steel structure proposed in the above background technology.

In order to solve the technical problem, an easy-to-assemble mounting rack for a deformation detection device for a steel structure is provided. The easy-to-assemble mounting rack includes mounting parts. The mounting parts include a back mounting plate, an operating rod, an adjusting seat, a ball-shaped block and an upright rod. The upright rod is vertically fixed at a bottom end face of the adjusting seat. A ball-shaped hole is formed in the adjusting seat. The ball-shaped block is rotatably embedded in the ball-shaped hole. The ball-shaped block is provided with a plug-in hole in a radial direction thereof. One end of the operating rod slidably penetrates through the plug-in hole and is detachably connected with the back mounting plate. Screw holes that are directly opposite to mounting holes of the deformation detection device are formed on the back mounting plate. The adjusting seat is stably and vertically erected by the upright post, the ball-shaped block is rotatably arranged in the ball-shaped hole, the operating rod slidably penetrates through the plug-in hole and is rotatable in the plug-in hole, and the back mounting plate is arranged at the one end of the operating rod. In this way, the mounting rack for mounting the deformation detection device is assembled. Each of the mounting holes of the deformation detection device is aligned to a corresponding one of the screw holes of the back mounting plate, and the mounting rack is fastened by bolts.

An other end of the operating rod is fixedly sleeved with a counterweight plate. By enabling the counterweight plate to provide a counterweight for the deformation detection device, the center of gravity of the operating rod is balanced, which does not cause the one end of the operating rod to be heavier and the other end of the operating rod to be lighter. So, it is more labor-saving when the operating rod is pushed and pulled along the plug-in hole.

In some embodiments of the present disclosure, two connecting blocks may be fixed at an upper end and a lower end of a side wall, which may be opposite to the operating rod, of the back mounting plate, respectively. Each of two clamping blocks may be fixed at an end of a corresponding one of the two connecting blocks. The two clamping blocks extend in a direction that the two clamping blocks may be away from each other, to protrude from the connecting blocks respectively. An upper one of the two clamping blocks may form a first inclined plane with an upper edge of the first inclined plane closer to the back mounting plate with respect to a lower edge of the first inclined plane, and a lower one of the two clamping blocks may form a second inclined plane with a lower edge of the second inclined plane closer to the back mounting plate with respect to an upper edge of the second inclined plane. The one end of the operating rod may be fixedly provided with two abutting plates in a V-shaped structure. A rectangular hole may be formed in an end of each of the two abutting plates. Each of the two clamping blocks may be slidable along a side wall of a corresponding one of the two butting plates by means of a corresponding one of the first inclined plane and the second inclined plane to enable the two butting plates to be spaced apart until a respective one of the two clamping blocks may slide into the rectangular hole. It is ensured that the two clamping blocks of the back mounting plate cannot be separated from the respective rectangular holes of the two abutting plates without external force intervention.

In some embodiments of the present disclosure, a handle is radially fixed at the other end, away from the back mounting plate, of the operating rod.

In some embodiments of the present disclosure, a rotating groove may be formed in an inner wall of the plug-in hole of the ball-shaped block. A rotating column may be rotatably arranged in the rotating groove. An outer wall of the rotating column may protrude into the plug-in hole from the rotating groove and may be fixedly provided with multiple polyvinyl chloride (PVC) plastic elastic sheets. Multiple arc grooves distributed along an axial direction of the operating rod may be formed in an outer wall of the operating rod. An outer wall of one of the multiple PVC plastic elastic sheets may abut against an inner wall of one of the multiple arc grooves when the rotating column may rotate, such that the one of the multiple PVC plastic elastic sheets may be compressively deformed to increase damping of the operating rod when the operating rod may be pushed and pulled along an inner wall of the plug-in hole.

In some embodiments of the present disclosure, two ends of each of the multiple PVC plastic elastic sheets may be fixedly connected with the outer wall of the rotating column after being bent. The outer wall of the one of the multiple PVC plastic elastic sheets may be matched with the inner wall of the one of the multiple arc grooves.

In some embodiments of the present disclosure, a guide notch may be formed in the outer wall of the operating rod. The inner wall of the plug-in hole may be fixedly provided with a sliding block slidably clamped with the inside of the guide notch.

In some embodiments of the present disclosure, supporting parts may be arranged at the bottom of the upright rod. The supporting parts may include a transverse plate and a base plate. One end of the transverse plate may be fixed to a bottom end face of the upright rod. A bottom end face of the transverse plate may be vertically fixed with a supporting column coaxially distributed with the upright rod. The base plate may be fixed to a bottom end face of the supporting column. The base plate may be rotatably plugged with a connecting shaft through a rotating hole. Each of both ends of the connecting shaft may extend to a corresponding one of both ends of the base plate and may be fixedly connected with a roller. Another end, away from the upright rod, of the transverse plate may be slidably plugged with an H-shaped rod through a sliding hole. An outer wall of the H-shaped rod may be sleeved with a spring located below the transverse plate. A bottom end of the H-shaped rod may be flush with a lowest point of a radial side wall of the roller. By means of the elastic force of the spring, the bottom end of the H-shaped rod is flush with the lowest point of the radial side wall of the roller, which ensures that a whole support rack is stably erected to meet the supporting requirement of the deformation detection device.

When the whole structure is moved, the H-shaped rod is lifted up by setting the rollers as rotation centers, so that the whole structure is distributed obliquely. The whole structure is moved by the traction of the rollers until the whole structure is moved to a detection position of the steel structure. Then, the H-shaped rod is put down by setting the rollers as the rotation centers, and then the specific position of the deformation detection device is adjusted according to a specific detection position, so that the detection requirement is met.

In some embodiments of the present disclosure, a first adjusting cavity communicating with the sliding hole may be formed in the transverse plate. A second adjusting cavity communicating with the first adjusting cavity may be axially formed in the supporting column. The second adjusting cavity may communicate with the rotating hole of the base plate. A push block may be slidably arranged in the first adjusting cavity. A side wall of the push block may be fixedly provided with a push rod that may be slidable along an inner wall of the first adjusting cavity. An adjusting rod may be slidably arranged in the second adjusting cavity. An upper end of the adjusting rod may extend into the first adjusting cavity. A top of a side wall of the adjusting rod may be fixedly provided with a toggle block. An end of the toggle block may be provided with a toggle inclined plane slidably attached to an end of the push rod. A bottom end of the adjusting rod may extend into the rotating hole and may be fixedly provided with a toothed block. Tooth slots in an annular structure may be formed in an outer wall of the connecting shaft. The toothed block may be engaged with one of the tooth slots. A first magnet block may be embedded in the outer wall of the H-shaped rod. A second magnet block may be embedded in the push block. A magnetic pole of a side portion of the second magnet block may be the same as a magnetic pole of a side portion of the first magnet block, and the side portion of the first magnet block may be opposite to the side portion of the second magnet block. When the whole structure is adjusted from a horizontal state to an inclined state, the H-shaped rod gradually slides downward by the elastic force of the spring. After the first magnet block and the push block face to each other, the push block and the push rod may be pushed to one side close to the adjusting rod by the repulsive force between the first magnet block and the second magnet block. The push rod may slide along the toggle inclined plane of the toggle block while pushing. Thus, the adjusting rod slides upward along the second adjusting cavity, and the toothed block is separated from the tooth slot. At this time, the whole structure is also in the inclined state, and the rollers are released from the limitation, so that the movement operation of the deformation detection device can be realized by rolling.

In some embodiments of the present disclosure, a limiting groove may be formed in an inner wall of the second adjusting cavity. An outer wall of the adjusting rod may be fixedly provided with a limiting plate slidably clamped with the limiting groove. One end, away from the sliding hole, of the first adjusting cavity may be fixedly provided with a stainless steel pressure plate. An end of the stainless steel pressure plate may be slidably attached to a top end face of the adjusting rod.

An assembling method of an easy-to-assemble mounting rack for a deformation detection device for a steel structure includes the following steps:
  erecting stably and vertically the adjusting seat by the upright rod, arranging rotatably the ball-shaped block in the ball-shaped hole, enabling the operating rod to slidably penetrate through the plug-in hole and rotate in the plug-in hole, and arranging the back mounting plate at the one end of the operating rod so as to assemble the mounting rack for mounting the deformation detection device, aligning each of the mounting holes of the deformation detection device to a corresponding one of the screw holes of the back mounting plate, and fastening the mounting rack by bolts; and
  holding the other end, away from the back mounting plate, of the operating rod to rotate the ball-shaped block in any direction in the ball-shaped hole of the adjusting seat after the deformation detection device is mounted and pushing and pulling the operating rod along the plug-in hole of the ball-shaped block freely to adjust the deformation detection device in any direction according to a detection position requirement of the steel structure with different sizes and lengths until the deformation detection device is directly attached to a detection position of the steel structure, and carrying out a deformation detection operation on a surface of the steel structure.

The embodiments have the following effects. According to the easy-to-assemble mounting rack for the deformation detection device for the steel structure and the assembling method thereof, the deformation detection device for the steel structure is mounted on the mounting parts. For steel structures with different sizes and lengths, according to the requirement of the detection position, the detection position of the detection device is quickly adjusted by means of the mounting parts, so that the efficiency of the deformation detection of the steel structure is improved, and the deformation detection requirement is met.

List of the reference characters: 1 handle; 2 counterweight plate; 3 ball-shaped block; 4 adjusting seat; 5 operating rod; 6 abutting plate; 7 back mounting plate; 8 transverse plate; 9 H-shaped rod; 10 spring; 11 roller; 12 base plate; 13 supporting column; 14 upright rod; 15 first magnet block; 16 push block; 17 push rod; 18 toggle block; 19 stainless steel pressure plate; 20 adjusting rod; 21 limiting plate; 22 connecting shaft; 23 toothed block; 24 sliding block; 25 rotating column; 26 PVC plastic elastic sheet; 27 rectangular hole; and 28 clamping block.

DETAILED DESCRIPTION OF THE EMBODIMENTS

In combination with the Drawings, the technical solution in the present disclosure is described clearly and completely. In the description of the present disclosure, it needs to be illustrated that the indicative direction or position relations of the terms such as "center", "top", "bottom", "left", "right", "vertical", "horizontal", "inside" and "outside" are direction or position relations illustrated based on the Drawings, just for facilitating the description of the present disclosure and simplifying the description, but not for indicating or hinting that the indicated device or element must be in a specific direction and is constructed and operated in the specific direction, the terms cannot be understood as the restriction of the present disclosure. Moreover, terms such as "first", "second" and "third" are just used for distinguishing the description, but cannot be understood to indicate or hint relative importance.

In the description of the present disclosure, it needs to be illustrated that, except as otherwise noted, the terms such as install", "link" and "connect" should be generally understood; for example, the components can be fixedly connected, and also can be detachably connected or integrally connected; the components can be mechanically connected, and also can be electrically connected; the components can be directly connected and also can be indirectly connected through an intermediate, and two components can be communicated internally. For those skilled in the art, the specific meanings of the terms in the present disclosure can be understood according to specific conditions.

The present disclosure is further described below in combination with the Drawings.

Figure 1:
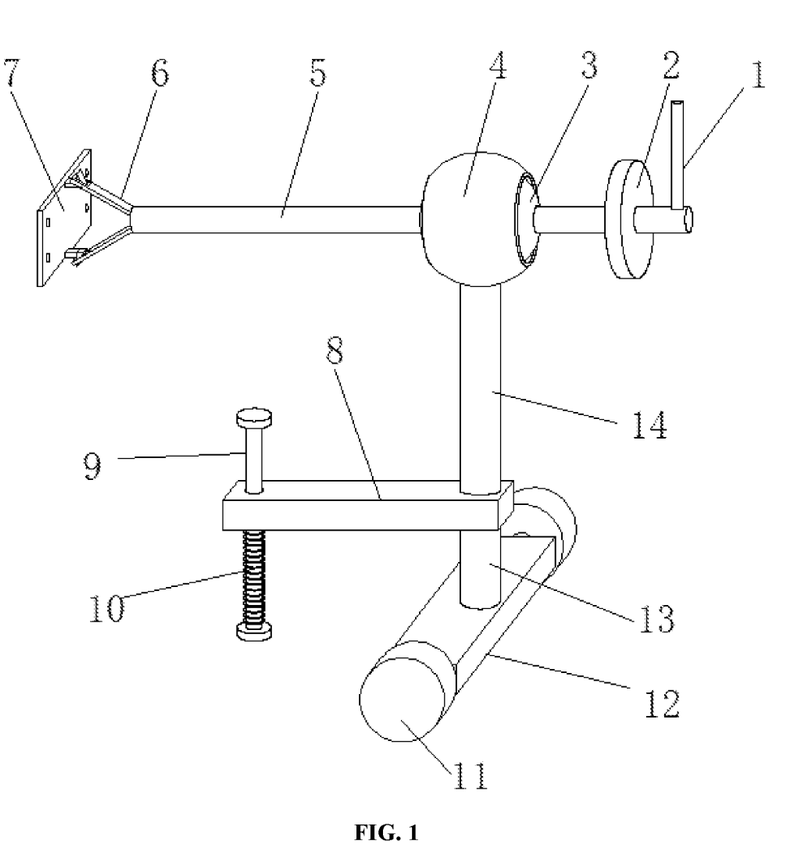
FIG. 1 is a structural schematic diagram according to some embodiments of the present disclosure.

Referring to FIG. 1, the present disclosure provides an easy-to-assemble mounting rack for a deformation detection device for a steel structure. The mounting rack includes mounting parts. The mounting parts include a back mounting plate 7, an operating rod 5, an adjusting seat 4, a ball-shaped block 3 and an upright rod 14. The upright rod 14 is vertically fixed at the bottom end face of the adjusting seat 4. A ball-shaped hole is formed in the adjusting seat 4. The ball-shaped block 3 is rotatably embedded in the ball-shaped hole. The ball-shaped block 3 is provided with a plug-in hole in a radial direction thereof. One end of the operating rod 5 slidably penetrates through the plug-in hole and is detachably connected with the back mounting plate 7. Screw holes directly opposite to the mounting holes of the deformation detection device are formed on the back mounting plate 7. The adjusting seat 4 is stably and vertically erected by the upright post 14, the ball-shaped block 3 is rotatably arranged in the ball-shaped hole, the operating rod 5 slidably penetrates through the plug-in hole and is rotatable in the plug-in hole, the back mounting plate 7 is arranged at the one end of the operating rod 5, and thus the mounting rack for mounting the deformation detection device is assembled. The mounting holes of the deformation detection device are aligned to the screw holes of the back mounting plate 7, and the mounting rack is fastened by bolts.

After the deformation detection device is mounted, one end, away from the back mounting plate 7, of the operating rod 5 is held to rotate the ball-shaped block 3 in any direction in the ball-shaped hole of the adjusting seat 4. At the same time, the operating rod 5 is freely pushed and pulled along the plug-in hole of the ball-shaped block 3 to adjust the deformation detection device in any direction according to the requirement of a detection position of steel structures with different sizes and lengths until the deformation detection device is directly attached to a detection position of the steel structure, and a deformation detection operation may be carried out on the surface of the steel structure, so that the efficiency of the deformation detection of the steel structure is improved, and the requirement of the deformation detection is met.

The deformation detection device has a certain heavy, which can cause the center of gravity of the operating rod 5 to be unstable, resulting in greater physical consumption of workers. As shown in FIG. 1, the other end of the operating rod 5 is fixedly sleeved with a counterweight plate 2. By enabling the counterweight plate 2 to provide a counterweight for the deformation detection device, the center of gravity of the operating rod 5 is balanced, which does not cause the one end of the operating rod 5 to be heavier and the other end of the operating rod 5 to be lighter. So, it is more labor-saving when the operating rod 5 is pushed and pulled along the plug-in hole.

The deformation detection device is mounted on the back mounting plate 7 for the deformation detection operation. After the detection of the deformation detection device is finished, the back mounting plate 7 is separated from the one end of the operating rod 5, and the deformation detection device is stored to prevent the deformation detection device from being exposed to the air for a long time or being damaged due to objective factors.

Figure 8:
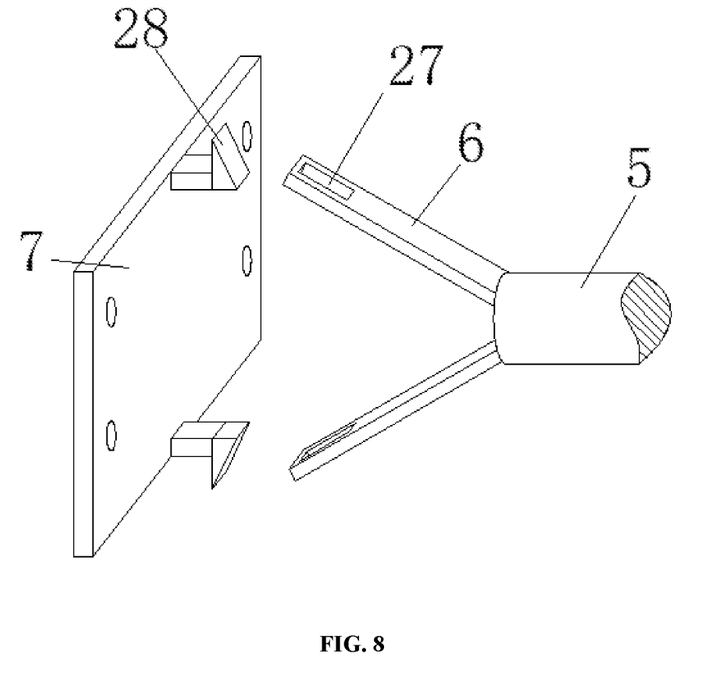
FIG. 8 is an explosive structural view of a back mounting plate, two abutting plates and an operating rod according to some embodiments of the present disclosure.

Referring to FIG. 8, a connecting block is fixed at each of an upper end and a lower end of a side wall, which is opposite to the operating rod, of the back mounting plate 7. A clamping block 28 is fixed at the end of the connecting block. The two clamping blocks 28 extend in a direction that the two clamping blocks 28 are away from each other, to protrude from the connecting blocks respectively, and an upper one of the two clamping blocks 28 forms a first inclined plane with an upper edge of the first inclined plane closer to the back mounting plate 7 with respect to a lower edge of the first inclined plane, and a lower one of the two clamping blocks 28 forms a second inclined plane with a lower edge of the second inclined plane closer to the back mounting plate 7 with respect to an upper edge of the second inclined plane. The one end of the operating rod 5 is fixedly provided with two abutting plates 6 distributed in a V-shaped structure. A rectangular hole 27 is formed in the end of each of the two abutting plates 6. The abutting plate 6 may be made of PVC plastics or stainless steel, and is of a certain reversible deformation characteristic. The two clamping blocks 28, respectively slide along opposite side walls of the two butting plates 6 by means of the incline planes, and the two butting plates 6 are spaced apart in a direction of away from each other, until the two clamping blocks 28 slide into the corresponding rectangular holes 27. The two spaced-apart abutting plates 6 lose the spacing-apart force and thus elastically reset. The ends, away from the operating rod 5, of the two abutting plates 6 respectively fall on side walls of the two connecting blocks, so as to ensure that the two clamping blocks 28 of the back mounting plate 7 cannot be separated from the rectangular holes 27 of the two butting plates 6 without external force intervention.

When the back mounting plate 7 is disassembled, the two abutting plates 6 are spaced apart in the direction of away from each other by hands, and the position of the back mounting plate 7 is kept still, so that the clamping blocks 28 may be separated from the rectangular holes 27 of the abutting plates 6.

Referring to FIG. 1, a handle 1 is radially fixed at the other end, away from the back mounting plate 7, of the operating rod 5. The handle 1 is held, so that the operating rod 5 is convenient to operate for pushing, pulling and rotating operations.

Figure 6:
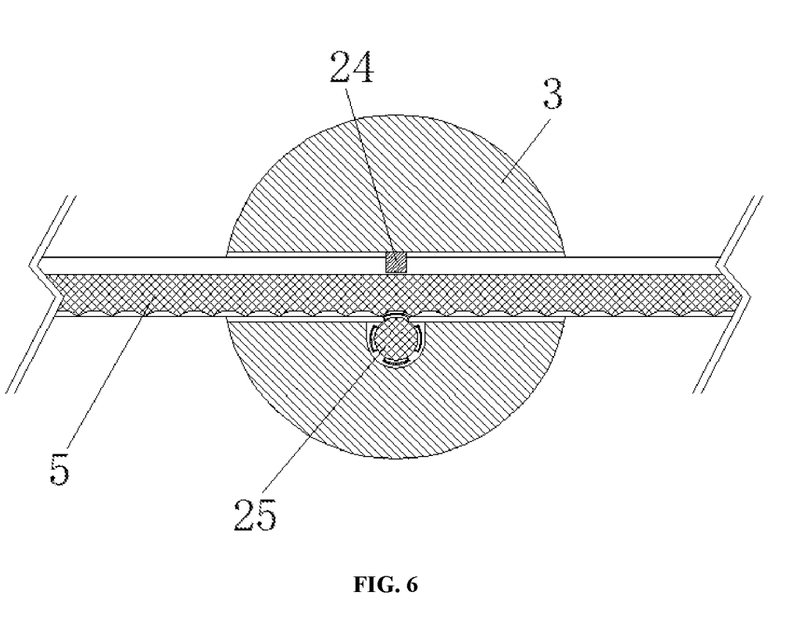
FIG. 6 is a structural sectional view of a ball-shaped block and an operating rod according to some embodiments of the present disclosure.

The operating rod 5 is slidably plugged with the plug-in hole of the ball-shaped block 3, and thus there is no resistance when the operating rod 5 is pushed and pulled along the plug-in hole, so when the deformation detection device is adjusted to the detection position of the steel structure, position deviation is easy to occur, thereby resulting in the decrease of detection accuracy. As shown in FIG. 6, a rotating groove is formed in the inner wall of the plug-in hole of the ball-shaped block 3. A rotating column 25 is rotatably arranged in the rotating groove. An outer wall of the rotating column 25 protrudes into the plug-in hole from the rotating groove and is fixedly provided with multiple PVC plastic elastic sheets 26. Multiple arc grooves distributed along an axial direction of the operating rod 5 are formed in an outer wall of the operating rod 5. An outer wall of the PVC plastic elastic sheet 26 abuts against an inner wall of the arc groove. When the operating rod 5 is pushed and pulled along the plug-in hole, the arc groove of the operating rod 5 passes through the PVC plastic elastic sheet 26 of the rotating column 25, the rotating column 25 may be driven to rotate. The PVC plastic elastic sheet 26 is compressively deformed to increase damping of the operating rod 5 when the operating rod 5 is pushed and pulled along an inner hole of the plug-in hole, so that the operating rod 5 is prevented from freely sliding to cause too high speed when the deformation detection device is moved and adjusted.

Figure 7:
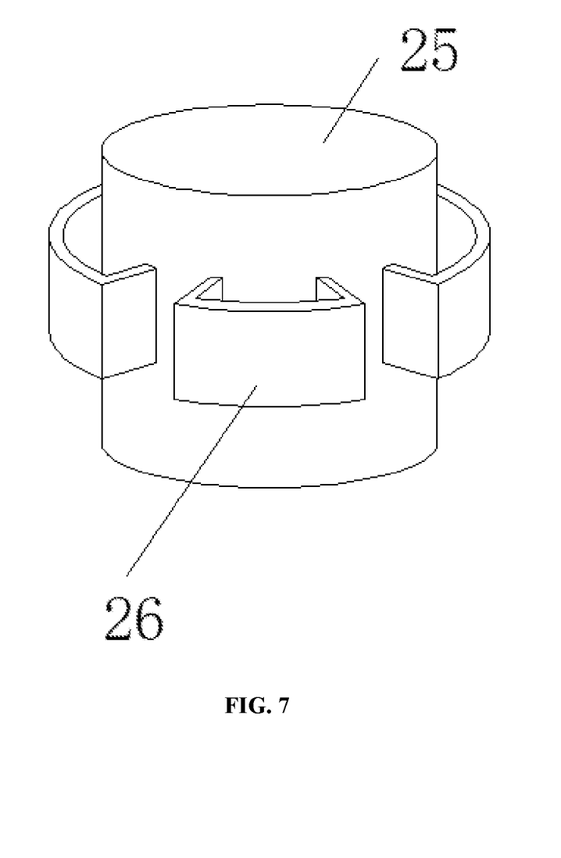
FIG. 7 is a structural schematic diagram of a rotating column according to some embodiments of the present disclosure.

Referring to FIG. 7, both ends of the PVC plastic elastic sheet 26 are fixedly connected with the outer wall of the rotating column 25 after being bent, and the outer wall of the PVC plastic elastic sheet 26 is matched with the inner wall of the arc groove. When the PVC plastic elastic sheet 26 enters the next arc groove from the previous arc groove, the PVC plastic elastic sheet 26 is compressively deformed by the extrusion of the outer wall of the operating rod 5 to generate potential rebound energy, which increases the damping of pulling the operating rod 5.

A guide notch is formed in the outer wall of the operating rod 5, and the inner wall of the plug-in hole is fixedly provided with a sliding block 24 slidably clamped with the inside of the guide notch. When the operating rod 5 is pushed and pulled along the plug-in hole, the sliding block 24 is slidably clamped with the guide notch to avoid relative rotation between the operating rod 5 and the ball-shaped block 3, which ensures that the arc groove of the operating rod 5 is always opposite to the rotating column 25.

Referring to FIG. 1, supporting parts are arranged at the bottom of the upright rod 14. The upright rod 14 is stably erected by means of the supporting parts, namely the mounting rack for mounting the deformation detection device is stably supported, and the deformation detection device may also be moved through the supporting parts, so that the maneuverability is high, and the detection efficiency is improved.

Figure 2:
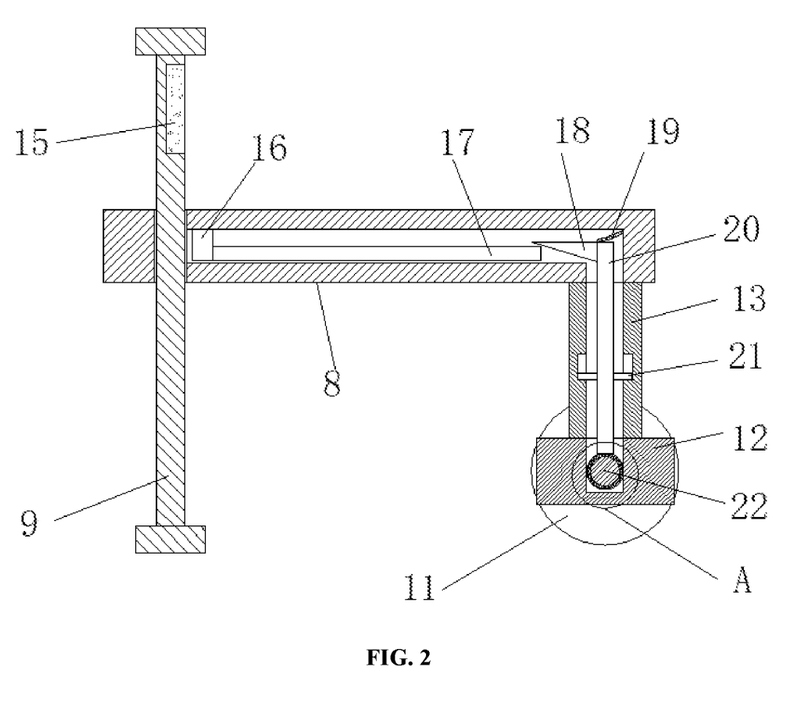
FIG. 2 is a structural sectional view of a transverse plate, an H-shaped rod, a supporting column and a base plate according to some embodiments of the present disclosure.

Referring to FIG. 1 and FIG. 2, the supporting parts include a transverse plate 8 and a base plate 12. One end of the transverse plate 8 is fixed to the bottom end face of the upright rod 14. The bottom end face of the transverse plate 8 is vertically fixed with a supporting column 13 coaxially distributed with the upright rod 14. The base plate 12 is fixed to the bottom end face of the supporting column 13. The base plate 12 is rotatably plugged with a connecting shaft 22 through a rotating hole. Each of both ends of the connecting shaft 22 extends to a corresponding one of both ends of the base plate 12 and is fixedly connected with a roller 11. The other end, away from the upright rod 14, of the transverse plate 8 is slidably plugged with an H-shaped rod 9 through a sliding hole. An outer wall of the H-shaped rod 9 is sleeved with a spring 10 located below the transverse plate 8. By means of an elastic force of the spring 10, the bottom end of the H-shaped rod 9 is flush with the lowest point of a radial side wall of the roller 11. In this way, a whole support rack is stably erected to meet a supporting requirement of the deformation detection device.

Referring to FIG. 2, FIG. 3, FIG. 4 and FIG. 5, a first adjusting cavity communicating with the sliding hole is formed in the transverse plate 8. A second adjusting cavity communicating with the first adjusting cavity is axially formed in the supporting column 13. The second adjusting cavity communicates with the rotating hole of the base plate 12. A push block 16 is slidably arranged in the first adjusting cavity. A side wall of the push block 16 is fixedly provided with a push rod 17 that is slidable along the inner wall of the first adjusting cavity. An adjusting rod 20 is slidably arranged in the second adjusting cavity. An upper end of the adjusting rod 20 extends into the first adjusting cavity. A top of a side wall of the adjusting rod 20 is fixedly provided with a toggle block 18. An end of the toggle block 18 is provided with a toggle inclined plane slidably attached to an end of the push rod 17. A bottom end of the adjusting rod 20 extends into the rotating hole and is fixedly provided with a toothed block 23. Tooth slots distributed in an annular structure are formed in an outer wall of the connecting shaft 22. The toothed block 23 is engaged with the tooth slot. When the whole structure is moved, the H-shaped rod 9 is lifted with the rollers 11 as rotation centers, so that the whole structure is distributed obliquely. The whole structure is moved by the traction of the rollers until the whole structure is moved to a detection position of the steel structure. Then, the H-shaped rod 9 is put down with the rollers 11 as the rotation centers, and then a specific position of the deformation detection device is adjusted according to a specific detection position, so that the detection requirement is met.

Due to the fact that when the whole structure is adjusted from a horizontal state to an inclined state without any limitation of the rollers, the rollers 11 may roll along a force application direction. Therefore, it is necessary to restrict the rollers from rotating and quickly adjust the whole structure to the inclined state. In a natural state, the bottom of the H-shaped rod 9 is flush with the bottom end face of the roller 11 by the elastic force of the spring 10. A first magnet block 15 is embedded in the outer wall of the H-shaped rod 9. A second magnet block is embedded in the push block 16. A magnetic pole of a side portion of the second magnet block is the same as a magnetic pole of a side portion of the first magnet block 15, which is opposite to the side wall of the second magnet block, to generate mutual repulsive forces. At this time, the first magnet block 15 and the second magnet block are distributed in a staggered manner. As shown in FIG. 2, therefore, the push block 16 is not subjected to pushing force, and the adjusting rod 20 slides down along the second adjusting cavity, so that the toothed block 23 is stuck in the tooth slot at a corresponding position, the connecting shaft 22 does not rotate, and the rollers 11 do not rotate. When the whole structure is adjusted from the horizontal state to the inclined state, the H-shaped rod 9 gradually slides downward by the elastic force of the spring 10. After the first magnet block 15 and the push block 16 face to each other, the push block 16 and the push rod 17 may be pushed to one side close to the adjusting rod 20 by the repulsive forces between the first magnet block 15 and the second magnet block. The push rod 17 can slide along the toggle inclined plane of the toggle block 18 while pushing. Thus, the adjusting rod 20 slides upward along the second adjusting cavity, and the toothed block 23 is separated from the tooth slot. At this time, the whole structure is also in the inclined state, and the rollers 11 are released from the limitation, so that the movement operation of the deformation detection device can be realized by rolling.

Figure 3:
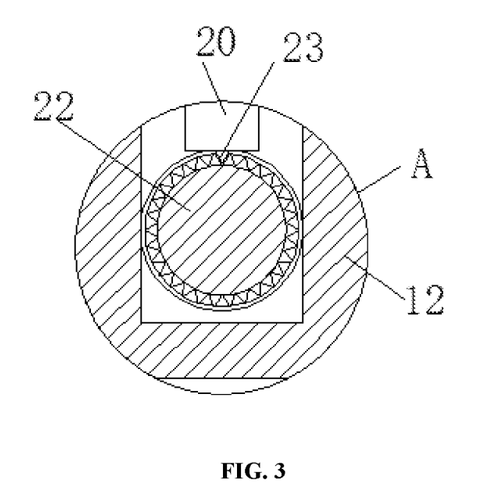
FIG. 3 is a structural enlarged view at part A in FIG. 2 according to some embodiments of the present disclosure.
Figure 4:
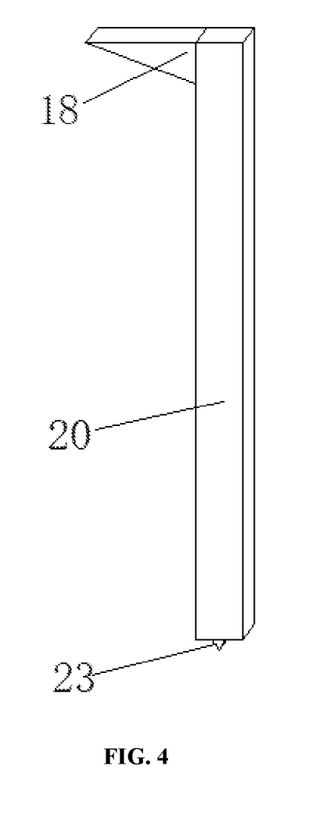
FIG. 4 is a structural schematic diagram of an adjusting rod according to some embodiments of the present disclosure.
Figure 5:
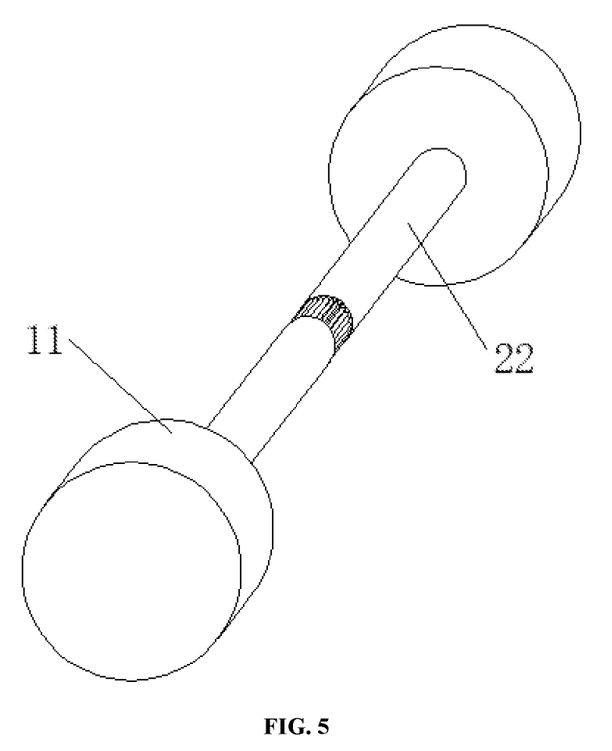
FIG. 5 is a structural schematic diagram of rollers and a connecting shaft according to some embodiments of the present disclosure.

A limiting groove is formed in the inner wall of the second adjusting cavity. An outer wall of the adjusting rod 20 is fixedly provided with a limiting plate 21 slidably clamped with the limiting groove. One end, away from the sliding hole, of the first adjusting cavity is fixedly provided with a stainless steel pressure plate 19. An end of the stainless steel pressure plate 19 is slidably attached to a top end face of the adjusting rod 20. By means of the elastic force of the stainless steel pressure plate 19, it is ensured that the toothed block 23 of the adjusting rod 20 is not separated away from the tooth slot under the condition of no external force intervention, so that the rollers 11 are avoided from rotating freely.

The foregoing descriptions are merely example implementations of the present disclosure. It should be noted that those skilled in the art may make several improvements or embellishments without departing from the principle of the present disclosure and the improvements or embellishments shall fall within the protection scope of the present disclosure.

Other parts not detailed in the present disclosure belong to the prior art, so unnecessary details are not given herein.

Finally, it should be noted that the foregoing embodiments are merely intended for describing the technical solutions of the present disclosure, but not for limiting the present disclosure. Although the present disclosure is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. An easy-to-assemble mounting rack for a deformation detection device for a steel structure, comprising mounting parts, wherein the mounting parts comprise a back mounting plate (7), an operating rod (5), an adjusting seat (4), a ball-shaped block (3) and an upright rod (14), the upright rod (14) is vertically fixed at a bottom end face of the adjusting seat (4), a ball-shaped hole is formed in the adjusting seat (4), the ball-shaped block (3) is rotatably embedded in the ball-shaped hole, the ball-shaped block (3) is provided with a plug-in hole in a radial direction thereof, one end of the operating rod (5) slidably penetrates through the plug-in hole and is detachably connected with the back mounting plate (7), screw holes that are directly opposite to mounting holes of the deformation detection device are formed on the back mounting plate (7), and an other end of the operating rod (5) is fixedly sleeved with a counterweight plate (2).

2. The easy-to-assemble mounting rack for the deformation detection device for the steel structure according to claim 1, wherein two connecting blocks are fixed at an upper end and a lower end of a side wall, which is opposite to the operating rod, of the back mounting plate (7) respectively, each of two clamping blocks (28) is fixed at an end of a corresponding one of the two connecting blocks, the two clamping blocks (28) extend in a direction that the two clamping blocks (28) are away from each other, to protrude from the connecting blocks respectively, and an upper one of the two clamping blocks (28) forms a first inclined plane with an upper edge of the first inclined plane closer to the back mounting plate (7) with respect to a lower edge of the first inclined plane, and a lower one of the two clamping blocks (28) forms a second inclined plane with a lower edge of the second inclined plane closer to the back mounting plate (7) with respect to an upper edge of the second inclined plane, the one end of the operating rod (5) is fixedly provided with two abutting plates (6) in a V-shaped structure, a rectangular hole (27) is formed in an end of each of the two abutting plates (6), each of the two clamping blocks (28) is slidable along a side wall of a corresponding one of the two butting plates (6) by means of a corresponding one of the first inclined plane and the second inclined plane to enable the two butting plates (6) to be spaced apart until a respective one of the two clamping blocks (28) slides into the rectangular hole (27).

3. The easy-to-assemble mounting rack for the deformation detection device for the steel structure according to claim 1, wherein a handle (1) is radially fixed at the other end, away from the back mounting plate (7), of the operating rod (5).

4. The easy-to-assemble mounting rack for the deformation detection device for the steel structure according to claim 1, wherein a rotating groove is formed in an inner wall of the plug-in hole of the ball-shaped block (3), a rotating column (25) is rotatably arranged in the rotating groove, an outer wall of the rotating column (25) protrudes into the plug-in hole from the rotating groove and is fixedly provided with a plurality of polyvinyl chloride (PVC) plastic elastic sheets (26), a plurality of arc grooves distributed along an axial direction of the operating rod (5) are formed in an outer wall of the operating rod (5); an outer wall of one of the plurality of PVC plastic elastic sheets (26) abuts against an inner wall of one of the plurality of arc grooves when the rotating column (25) rotates, such that the one of the plurality of PVC plastic elastic sheets (26) is compressively deformed to increase damping of the operating rod (5) when the operating rod (5) is pushed and pulled along an inner wall of the plug-in hole.

5. The easy-to-assemble mounting rack for the deformation detection device for the steel structure according to claim 4, wherein two ends of each of the plurality of PVC plastic elastic sheets (26) are fixedly connected with the outer wall of the rotating column (25) after being bent, and the outer wall of the one of the plurality of PVC plastic elastic sheets (26) is matched with the inner wall of the one of the plurality of arc grooves.

6. The easy-to-assemble mounting rack for the deformation detection device for the steel structure according to claim 4, wherein a guide notch is formed in the outer wall of the operating rod (5), and the inner wall of the plug-in hole is fixedly provided with a sliding block (24) slidably clamped with an inside of the guide notch.

7. The easy-to-assemble mounting rack for the deformation detection device for the steel structure according to claim 1, wherein supporting parts are arranged at a bottom of the upright rod (14), the supporting parts comprise a transverse plate (8) and a base plate (12), one end of the transverse plate (8) is fixed to a bottom end face of the upright rod (14), a bottom end face of the transverse plate (8) is vertically fixed with a supporting column (13) coaxially arranged with the upright rod (14), the base plate (12) is fixed to a bottom end face of the supporting column (13), the base plate (12) is rotatably plugged with a connecting shaft (22) through a rotating hole, each of both ends of the connecting shaft (22) extends to a corresponding one of both ends of the base plate (12) and is fixedly connected with a roller (11), an other end, away from the upright rod (14), of the transverse plate (8) is slidably plugged with an H-shaped rod (9) through a sliding hole, an outer wall of the H-shaped rod (9) is sleeved with a spring (10) located below the transverse plate (8), and a bottom end of the H-shaped rod (9) is flush with a lowest point of a radial side wall of the roller (11).

8. The easy-to-assemble mounting rack for the deformation detection device for the steel structure according to claim 7, wherein a first adjusting cavity communicating with the sliding hole is formed in the transverse plate (8), a second adjusting cavity communicating with the first adjusting cavity is axially formed in the supporting column (13), the second adjusting cavity communicates with the rotating hole of the base plate (12), a push block (16) is slidably arranged in the first adjusting cavity, a side wall of the push block (16) is fixedly provided with a push rod (17) that is slidable along an inner wall of the first adjusting cavity, an adjusting rod (20) is slidably arranged in the second adjusting cavity, an upper end of the adjusting rod (20) extends into the first adjusting cavity, a top of a side wall of the adjusting rod (20) is fixedly provided with a toggle block (18), an end of the toggle block (18) is provided with a toggle inclined plane slidably attached to an end of the push rod (17), a bottom end of the adjusting rod (20) extends into the rotating hole and is fixedly provided with a toothed block (23), tooth slots in an annular structure are formed in an outer wall of the connecting shaft (22), and the toothed block (23) is engaged with one of the tooth slots; and a first magnet block (15) is embedded in the outer wall of the H-shaped rod (9), a second magnet block is embedded in the push block (16), and a magnetic pole of a side portion of the second magnet block is a same as a magnetic pole of a side portion of the first magnet block (15), wherein the side portion of the first magnet block (15) is opposite to the side portion of the second magnet block.

9. The easy-to-assemble mounting rack for the deformation detection device for the steel structure according to claim 8, wherein a limiting groove is formed in an inner wall of the second adjusting cavity, an outer wall of the adjusting rod (20) is fixedly provided with a limiting plate (21) slidably clamped with the limiting groove; one end, away from the sliding hole, of the first adjusting cavity is fixedly provided with a stainless steel pressure plate (19), and an end of the stainless steel pressure plate (19) is slidably attached to a top end face of the adjusting rod (20).

10. An assembling method of an easy-to-assemble mounting rack for a deformation detection device, the easy-to-assemble mounting rack for a deformation detection device for a steel structure comprising mounting parts, wherein the mounting parts comprise a back mounting plate (7), an operating rod (5), an adjusting seat (4), a ball-shaped block (3) and an upright rod (14), the upright rod (14) is vertically fixed at a bottom end face of the adjusting seat (4), a ball-shaped hole is formed in the adjusting seat (4), the ball-shaped block (3) is rotatably embedded in the ball-shaped hole, the ball-shaped block (3) is provided with a plug-in hole in a radial direction thereof, one end of the operating rod (5) slidably penetrates through the plug-in hole and is detachably connected with the back mounting plate (7), screw holes that are directly opposite to mounting holes of the deformation detection device are formed on the back mounting plate (7), and an other end of the operating rod (5) is fixedly sleeved with a counterweight plate (2);

wherein the assembling method comprises:
erecting stably and vertically the adjusting seat (4) by the upright rod (14), arranging rotatably the ball-shaped block (3) in the ball-shaped hole, enabling the operating rod (5) to slidably penetrate through the plug-in hole and rotate in the plug-in hole, and arranging the back mounting plate (7) at the one end of the operating rod (5) so as to assemble the mounting rack for mounting the deformation detection device, aligning each of the mounting holes of the deformation detection device to a corresponding one of the screw holes of the back mounting plate (7), and fastening the mounting rack by bolts; and holding the other end, away from the back mounting plate (7), of the operating rod (5) to rotate the ball-shaped block (3) in any direction in the ball-shaped hole of the adjusting seat (4) after the deformation detection device is mounted, and pushing and pulling the operating rod freely (5) along the plug-in hole of the ball-shaped block (3) to adjust the deformation detection device in any direction according to a detection position requirement of the steel structure with different sizes and lengths until the deformation detection device is directly attached to a detection position of the steel structure, and carrying out a deformation detection operation on a surface of the steel structure.

11. The assembling method of the easy-to-assemble mounting rack for the deformation detection device according to claim 10, wherein two connecting blocks are fixed at an upper end and a lower end of a side wall, which is opposite to the operating rod, of the back mounting plate (7) respectively, each of two clamping blocks (28) is fixed at an end of a corresponding one of the two connecting blocks, the two clamping blocks (28) extend in a direction that the two clamping blocks (28) are away from each other, to protrude from the connecting blocks respectively, and an upper one of the two clamping blocks (28) forms a first inclined plane with an upper edge of the first inclined plane closer to the back mounting plate (7) with respect to a lower edge of the first inclined plane, and a lower one of the two clamping blocks (28) forms a second inclined plane with a lower edge of the second inclined plane closer to the back mounting plate (7) with respect to an upper edge of the second inclined plane, the one end of the operating rod (5) is fixedly provided with two abutting plates (6) in a V-shaped structure, a rectangular hole (27) is formed in an end of each of the two abutting plates (6), each of the two clamping blocks (28) is slidable along a side wall of a corresponding one of the two butting plates (6) by means of a corresponding one of the first inclined plane and the second inclined plane to enable the two butting plates (6) to be spaced apart until a respective one of the two clamping blocks (28) slides into the rectangular hole (27).

12. The assembling method of the easy-to-assemble mounting rack for the deformation detection device according to claim 10, wherein a handle (1) is radially fixed at the other end, away from the back mounting plate (7), of the operating rod (5).

13. The assembling method of the easy-to-assemble mounting rack for the deformation detection device according to claim 10, wherein a rotating groove is formed in an inner wall of the plug-in hole of the ball-shaped block (3), a rotating column (25) is rotatably arranged in the rotating groove, an outer wall of the rotating column (25) protrudes into the plug-in hole from the rotating groove and is fixedly provided with a plurality of polyvinyl chloride (PVC) plastic elastic sheets (26), a plurality of arc grooves distributed along an axial direction of the operating rod (5) are formed in an outer wall of the operating rod (5); an outer wall of one of the plurality of PVC plastic elastic sheets (26) abuts against an inner wall of one of the plurality of arc grooves when the rotating column (25) rotates, such that the one of the plurality of PVC plastic elastic sheets (26) is compressively deformed to increase damping of the operating rod (5) when the operating rod (5) is pushed and pulled along an inner wall of the plug-in hole.

14. The assembling method of the easy-to-assemble mounting rack for the deformation detection device according to claim 13, wherein two ends of each of the plurality of PVC plastic elastic sheets (26) are fixedly connected with the outer wall of the rotating column (25) after being bent, and the outer wall of the one of the plurality of PVC plastic elastic sheets (26) is matched with the inner wall of the one of the plurality of arc grooves.

15. The assembling method of the easy-to-assemble mounting rack for the deformation detection device according to claim 13, wherein a guide notch is formed in the outer wall of the operating rod (5), and the inner wall of the plug-in hole is fixedly provided with a sliding block (24) slidably clamped with an inside of the guide notch.

16. The assembling method of the easy-to-assemble mounting rack for the deformation detection device according to claim 10, wherein supporting parts are arranged at a bottom of the upright rod (14), the supporting parts comprise a transverse plate (8) and a base plate (12), one end of the transverse plate (8) is fixed to a bottom end face of the upright rod (14), a bottom end face of the transverse plate (8) is vertically fixed with a supporting column (13) coaxially arranged with the upright rod (14), the base plate (12) is fixed to a bottom end face of the supporting column (13), the base plate (12) is rotatably plugged with a connecting shaft (22) through a rotating hole, each of both ends of the connecting shaft (22) extends to a corresponding one of both ends of the base plate (12) and is fixedly connected with a roller (11), an other end, away from the upright rod (14), of the transverse plate (8) is slidably plugged with an H-shaped rod (9) through a sliding hole, an outer wall of the H-shaped rod (9) is sleeved with a spring (10) located below the transverse plate (8), and a bottom end of the H-shaped rod (9) is flush with a lowest point of a radial side wall of the roller (11).

17. The assembling method of the easy-to-assemble mounting rack for the deformation detection device according to claim 16, wherein a first adjusting cavity communicating with the sliding hole is formed in the transverse plate (8), a second adjusting cavity communicating with the first adjusting cavity is axially formed in the supporting column (13), the second adjusting cavity communicates with the rotating hole of the base plate (12), a push block (16) is slidably arranged in the first adjusting cavity, a side wall of the push block (16) is fixedly provided with a push rod (17) that is slidable along an inner wall of the first adjusting cavity, an adjusting rod (20) is slidably arranged in the second adjusting cavity, an upper end of the adjusting rod (20) extends into the first adjusting cavity, a top of a side wall of the adjusting rod (20) is fixedly provided with a toggle block (18), an end of the toggle block (18) is provided with a toggle inclined plane slidably attached to an end of the push rod (17), a bottom end of the adjusting rod (20) extends into the rotating hole and is fixedly provided with a toothed block (23), tooth slots in an annular structure are formed in an outer wall of the connecting shaft (22), and the toothed block (23) is engaged with one of the tooth slots; and
 a first magnet block (15) is embedded in the outer wall of the H-shaped rod (9), a second magnet block is embedded in the push block (16), and a magnetic pole of a side portion of the second magnet block is a same as a magnetic pole of a side portion of the first magnet block (15), wherein the side portion of the first magnet block (15) is opposite to the side portion of the second magnet block.

18. The assembling method of the easy-to-assemble mounting rack for the deformation detection device according to claim 17, wherein a limiting groove is formed in an inner wall of the second adjusting cavity, an outer wall of the adjusting rod (20) is fixedly provided with a limiting plate (21) slidably clamped with the limiting groove; one end, away from the sliding hole, of the first adjusting cavity is fixedly provided with a stainless steel pressure plate (19), and an end of the stainless steel pressure plate (19) is slidably attached to a top end face of the adjusting rod (20).

\* \* \* \* \*